Oct. 3, 1950     W. H. HARSTICK     2,524,194
MILKER TIMER
Filed Oct. 28, 1948     3 Sheets-Sheet 1
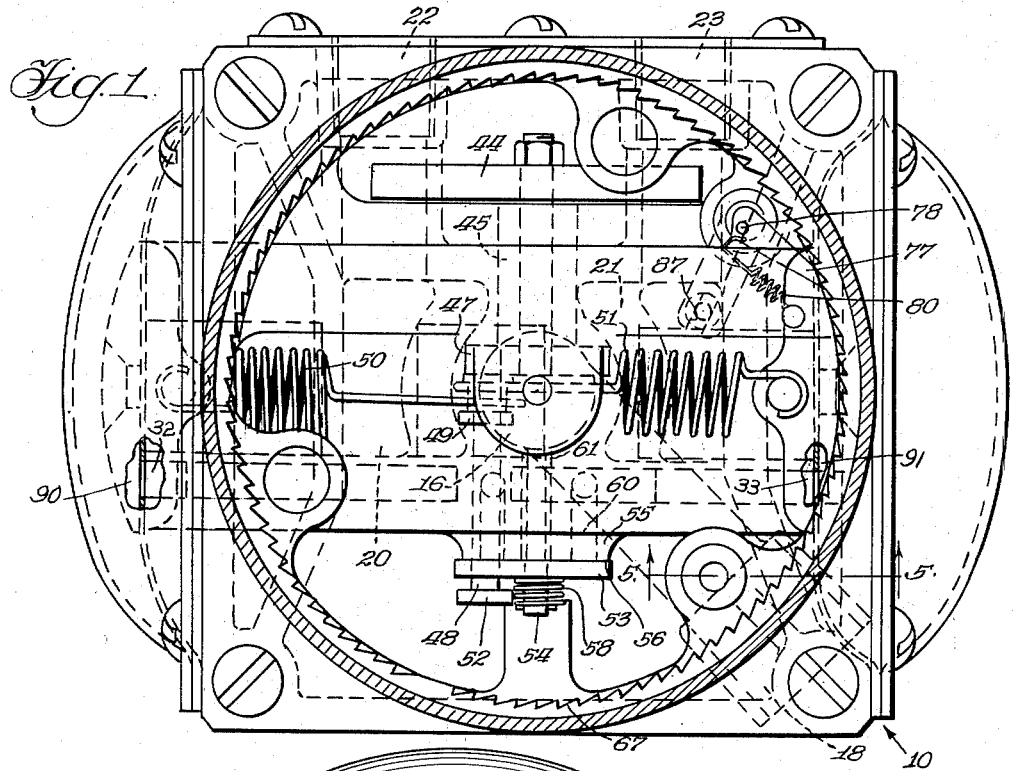
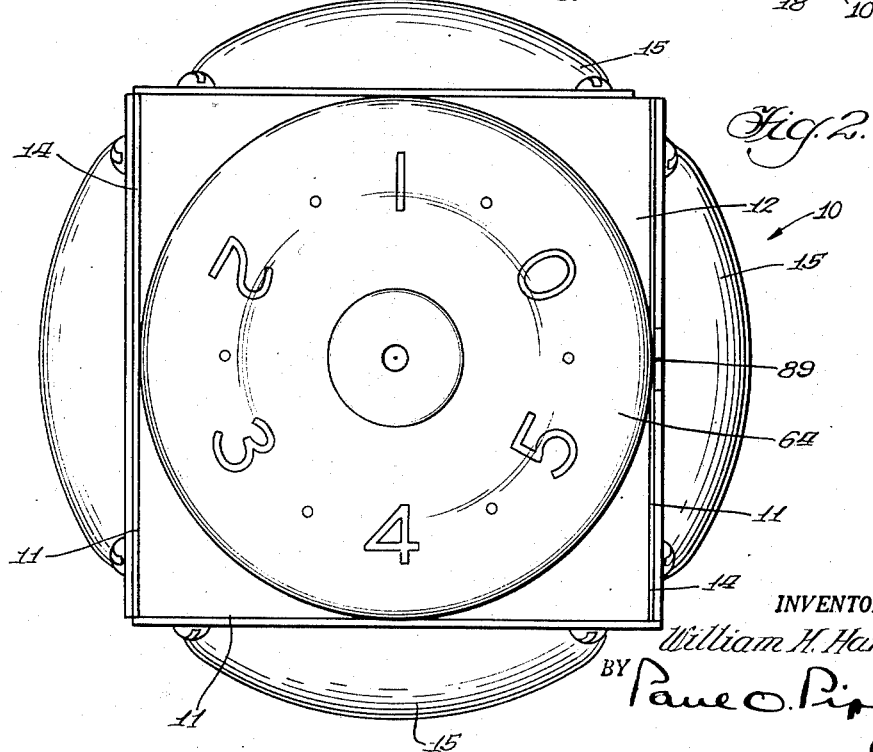
INVENTOR.
William H. Harstick
BY Paul O. Pippel
Atty.

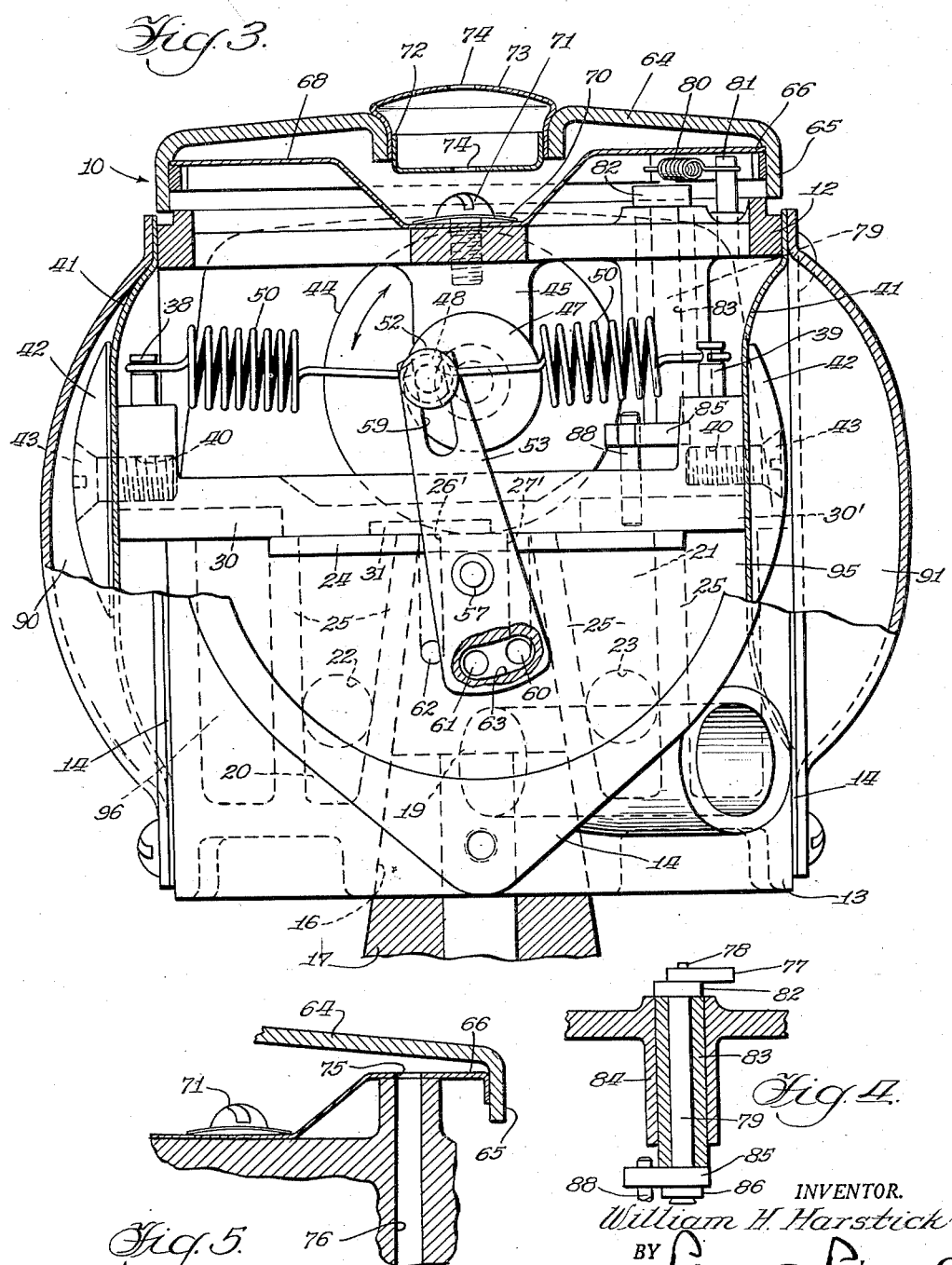

Oct. 3, 1950 W. H. HARSTICK 2,524,194
MILKER TIMER
Filed Oct. 28, 1948 3 Sheets-Sheet 3
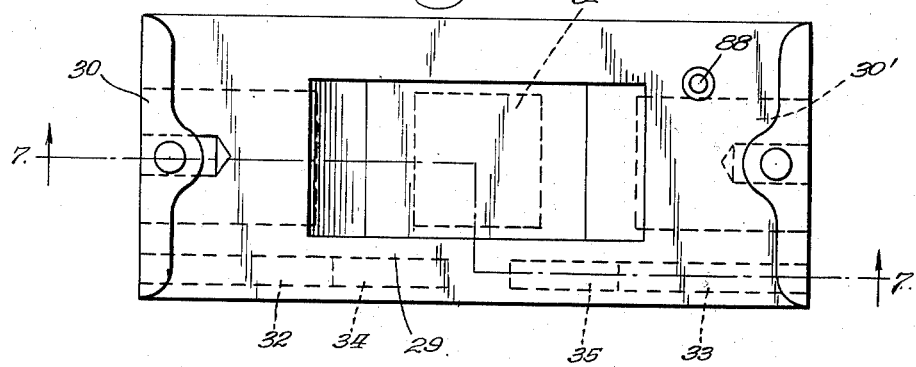
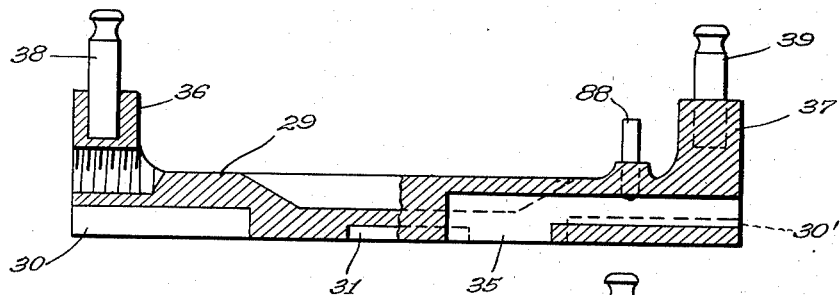
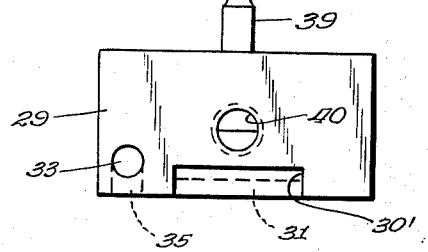
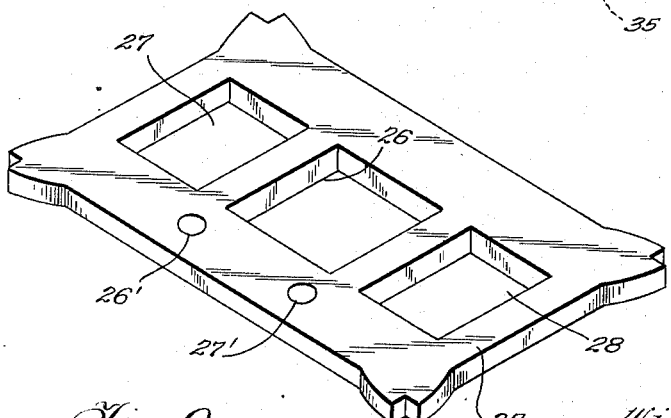
INVENTOR.
William H. Harstick
BY Paul O. Pippel
Atty.

Patented Oct. 3, 1950

2,524,194

UNITED STATES PATENT OFFICE 2,524,194

MILKER TIMER

William H. Harstick, Oak Park, Ill., assignor to International Harvester Company, a corporation of New Jersey Application October 28, 1948, Serial No. 56,959

5 Claims. (Cl. 161—23)

This invention relates to a pulsating mechanism for milking machines. More specifically this invention relates to a particular type of a slide valve pulsator having a novel timing device. The pulsator of the present application is of a conventional type widely utilized with milking machines. A slide valve is reciprocated by means of vacuum pressure producing, in turn, intermittent vacuum pulsation on the teat cup of a milker machine. The particular pulsator with which the present invention is concerned utilizes a fly-wheel construction for producing even, regular reciprocation of the slide valve.

In applicant's Patent 2,480,239 entitled, "Milker Pulsator Timer," patented Aug. 30, 1949, a novel timing device for a pulsator is shown and described. It is the prime object of this invention to provide an improvement in a milker timer of a type described in the above mentioned application as applied to a pulsator of the fly-wheel type.

It is another object to provide a timing device for a pulsator, said timing device being arranged to give an audible signal at a pre-selected time interval during the milking machine operation.

Another object is to provide an improved timer for a pulsator, said timer including a rotatable member which is directly driven from and by the reciprocating slide valve of the pulsator.

The present invention consists of a slide valve that is connected to a pair of spaced diaphragms. The diaphragms are arranged to reciprocate the slide valve to produce intermittent vacuum pulsations in a teat cup cluster. A milker timer is connected to rotate on the upper surface of the pulsator and a signalling device is provided that will, in response to the rotation of the timer, emit an audible signal when a predetermined milking interval has been completed. The timing element is provided with a rotatable element which is moved by means of a ratchet mechanism. In this respect the timer is very similar to the timing mechanism disclosed in the above mentioned application. In the present application the ratchet mechanism is positively driven by means of a positive mechanical connection from the reciprocating slide valve of the pulsator. The novel aspects of the invention will become more readily apparent upon a reading of the following description when examined in connection with the drawings.

In the drawings:

Fig. 1 is a plan view of a pulsator and a milking timing mechanism having portions of the pulsator broken away to better illustrate certain parts of the operating mechanism.

Fig. 2 is a plan view of the pulsating mechanism showing a rotating timing element.

Fig. 3 is a side elevational view of a pulsating mechanism and timer valve, said view having portions broken away to better illustrate the invention.

Fig. 4 is a sectional view through a ratchet mechanism arranged to operate a rotary timing element.

Fig. 5 is a sectional view substantially taken along the line 5—5 of Fig. 1 showing a portion of a signaling and timing mechanism.

Fig. 6 is a plan view of a slide valve for a pulsator.

Fig. 7 is a side elevational view taken substantially along the line 7—7 of Fig. 6.

Fig. 8 is an end view of a slide valve shown in Fig. 6.

Fig. 9 is a perspective view of a stationary valve slide.

As shown in the drawings, a pulsator unit is built around a cast-metal body structure which is designated in its entirety by the reference numeral 10. The body is generally formed with a plurality of bores and cored passages to facilitate and provide for the moving parts of the pulsator and to adequately distribute the fluid pressures to provide for the proper actuation of the slide valve and timing mechanism.

The pulsator metal body 10 is generally of a cube shape and includes sides 11, a top 12 and a bottom 13. The sides 11 include a plurality of flanges 14 which are arranged to receive covers 15.

Referring particularly to Figs. 1 and 3, the bottom 13 is provided with a cored passage or chamber 16. The passage 16 is of frusto-conical shape and is adapted to receive a connecting member 17 which is generally positioned on and in communication with a milker pail, not shown. The body 10 also includes a vacuum conduit 18 which is adapted to be connected to a source of vacuum. The conduit 18 is provided with an opening 19 which is in communication with the cored passage 16 of the bottom 13.

The body 10 also includes a pair of chambers 20 and 21. The chambers 20 and 21 are respectively provided with teat cup connections 22 and 23. The connections 22 and 23 may be placed in communication with a conventional type of teat cup cluster, not shown, in a manner which is well-known in the art.

As best shown in Fig. 3, a stationary valve plate or slide 24 is seated on vertically extending walls 25 of the body 10. As shown in Fig. 9, the valve plate 24 is provided with a centrally located opening 26 and a pair of openings 27 and 28 positioned at opposite sides of the opening 26. A slide valve 29 is shown in Fig. 6. The slide valve 29, as best shown in Fig. 3, is seated upon the stationary valve plate 24 and is arranged to reciprocate horizontally with respect thereto. The slide valve 29 includes recessed undercut portions 30 and 30'. Spaced laterally from the undercut portions 30 and 30' are a pair of bores 32 and 33. The bores 32 and 33 extend inwardly from the ends of the valve and are in communication with openings 34 and 35, opening on the underside of the slide valve 29. The slide valve 29 is also provided with a pair of upwardly extending projections 36 and 37 which are positioned at opposite ends of the valve. The projections 36 and 37 securely mount pins 38 and 39. As best shown in Fig. 3, the projections 36 and 37 are provided with inwardly extending threaded bores 40. A diaphragm 41 is securely connected to each end of the slide valve 29 by means of discs 42 and screws 43 which thread into the bores 40.

Referring particularly to Figs. 1 and 3, a flywheel 44 is securely positioned on the body 10 by means of a boss 45 projecting downwardly from the top 12 of the body 10. A shaft 46 is securely connected to the fly-wheel 44 and the shaft 46 is journalled within the boss 45. An annular crank member 47 is connected to one end of the shaft 46. As best shown in Fig. 1, the crank member 47 has an eccentrically positioned pin 48. A collar 49 is positioned on the pin immediately adjacent the crank member 47. A coil spring 50 has one end secured to the pin 38 of the valve slide 29. The other end of the spring 50 is secured around the collar 49. In a similar manner a spring 51 has one end secured to the pin 39 and has its other end secured around the collar 49.

The pin 48 extends laterally outwardly from the crank arm 47 and is provided at one end with a head 52. The pin 48 extends through a valve member 53 which is adapted to pivot or rock on a shaft 54 which extends into a projection 55 as best shown in Fig. 1. The projection 55 is provided with a valve seat or surface 56. A washer 57 is rigidly secured to one end of the shaft 54 and a spring 58 exerts a force on the valve member 53 forcing the same tightly up against the surface 56. The upper end of the valve member 53 is provided with an open end slot 59. The shaft 48 engages one end of the slot 59 for moving and oscillating the valve member 53. The surface 56 is provided with bores 60, 61 and 62 which extend inwardly into the boss 55. The bore 61 communicates with the chamber 16 and therefore has a constant vacuum depression therein.

The bores 60 and 62 are in registering communication with bores 26' and 27' formed in the stationary valve slide 24. The function of these bores will presently appear. The valve member 53 is also provided at its lower end with a recess or connecting bore 63 which is arranged to alternately place the bores 60 and 62 into communication with the bore 61.

A timing and signalling device is best shown in Figs. 1, 2 and 3. This device includes a cap or rotatable member 64 which is positioned for rotation on the top 12 of the body 10. The rotatable member 64 has a downwardly extending annular flange 65. The inner peripheral edge of the flange 65 is provided with a ratchet ring 66 having circumferentially extending ratchet teeth 67. An annular pivot plate 68 is securely connected to the rotatable member 64. The pivot plate 68 is centrally supported on the boss 45 by means of a washer 70 and screw 71 extending into the boss. The connection between the plate and boss is such that the cap or rotatable member 64 may be readily rotated. A sound emitting device or signal is centrally positioned on the cap 64. The sound emitting device 73 includes aligned openings 74.

As best shown in Fig. 5, the pivot plate 68 is provided at one point with an opening 75 which is adapted to register with a bore or conduit 76, said bore extending downwardly and being in continual communication with the conduit 18 as best shown in Fig. 1.

The cap 64 is rotated by means of a pawl 77. The pawl 77 is eccentrically connected by means of a pin 78 to a rotatable shaft 79. A spring 80 is connected to the pawl 77 and to a pin 81 for normally keeping the pawl in driving engagement with the ratchet teeth 67 of the ratchet ring 66. A shoulder 82 is positioned at the upper end of the shaft 79, the shoulder normally resting upon a bearing 83 which is firmly mounted in a downwardly extending boss 84. The shaft 79 is rotatable in the bearing 83. The lower end of the shaft 79 is provided with an outwardly extending arm 85. The arm 85 is rigidly connected to the end of the shaft 79 by means of a nut 86. As best shown in Fig. 1, an open end slot 87 is positioned in one end of the arm 85. A pin 88 as shown in Figs. 1, 3 and 7 is adapted to slide within the slot 87 for actuating and oscillating the arm 85 during reciprocation of the slide valve 29.

The cap 64 may readily be manually rotated by an operator in a clockwise direction, and, as shown in Fig. 2, the cap includes a number of index numbers from zero to five on the top wall of the cap. A pointer or arrow 89 may be stationarily positioned on the pulsator structure as indicated. By merely turning the cap 64, the operator may set any of the indices opposite the pointer 89. The normal rate of operation of a milk pulsator is such that the numerals indicate the number of minutes required to move the cap 64 the angular distance at which the numerals appear. The opening 75 is generally underneath the numeral 0 and is so located that when the cap has been moved the angular distance selected, registration is with the bore 76 and an audible signal is induced through the signaling means 73. If, for example, the milking time of a cow is approximately 3 minutes, the cap 64 is rotated so that the numeral 3 is opposite the pointer 89. The pulsator is thereupon set in normal operation and as the milk is taken from the cow, the cap 64 is rotated by the action of the pulsator until the numeral 0 is opposite the pointer 89. At this point the opening 75 is in communication with the bore 76 and the vacuum pressure through the openings 74 of the sound emitting device 73 causes a whistling action to take place. The operator thus knows that the cow has been properly milked, and is ready to remove the teat cups.

The operation of the pulsating mechanism will now be described. The conduit 18 is in continual communication with a source of vacuum, not shown, therefore, a vacuum depression exists within the cored passage or chamber 16. In the position shown in Fig. 3, the slide valve 29 has moved to its extreme left-hand position with respect to the valve slide 24. In this position the centrally recessed portion 31 of the slide valve straddles the chamber 16 and the chamber 20. It can therefore be seen that since there is communication between chamber 16 and chamber 20, the teat cup opening 22 is provided with a vacuum depression, said vacuum depression actuating a teat cup inflation in a well-known manner. In this position a diaphragm chamber 90 is exposed to the atmosphere. As the valve slide 29 has been moved to its extreme left, the arm of the valve member 53 is thereupon rotated in a counter-clockwise direction by means of the spring 51 and the oscillation of the fly-wheel 44. In this position the recessed portion 63 of the valve 53 brings the openings 61 and 60 into communication with one another. As best shown in Fig. 1, the opening 61 is in communication with the continual source of vacuum within the chamber 16; thus, since the opening 61 is under continual depression the bore 63 is also under a vacuum depression. In the extreme left-hand position of the slide valve 29, the opening 35 of the slide valve is in communication with the openings 27' and 60. Since the opening 60 is in communication with the opening 61 a depression will be created in the diaphragm chamber 91. Stated in another manner, in the position of the valve 53, the vacuum opening 61 is in communication with the diaphragm chamber 91 by means of the openings 60, 35 and 33 which are in connection with the diaphragm chamber 91. Thus a vacuum depression is created within this chamber.

Since the diaphragm chamber 90 is open to the atmosphere and since a depression now exists in the diaphragm chamber 91, the valve slide 29 is moved to an extreme right-hand position. As the valve slide thus moves to the right-hand position, the spring 51 is placed under a tension and the fly-wheel 44 is oscillated in a counter-clockwise direction. As the fly-wheel 44 thus moves, the valve member 53 is pivoted in a clockwise manner on the shaft 54 whereupon the recess 63 is placed into communication with the bore 62. The bores 61 and 62 are now in communication with one another. The central recessed portion 31 of the valve slide 29 has now been moved to the right and thus straddles the chamber 16 and the chamber 21. As previously mentioned, since chamber 16 is under a continual vacuum depression, a vacuum depression is created in the chamber 21 and a pulsation thus occurs on a teat cup cluster which is connected to the opening 23.

The valve slide 29 can thus be reciprocated to create intermittent pulsations in a set of teat cups. The vacuum pulsation occurs due to the intermittent connection of the openings 22 and 23 with the vacuum chamber 16. Immediately after the valve slide 29 is moved toward either the diaphragm chambers 90 and 91 the depression in that particular chamber is destroyed and the chamber is open to the atmosphere. This is accomplished by recesses 30 and 30'. In Fig. 3 recess 30' has been moved so that it straddles chamber 21 and a chamber 95 which is open to the atmosphere. Thus chamber 21 and teat cups in communication therewith no longer have a vacuum depression but are open to the atmosphere. This results in a pulsation. Chamber 30 likewise will react with a chamber 96 in the same manner when the valve slide is moved to the left-hand position.

In the vacuum stroke of the slide valve the chamber 91 is in communication with chamber 21 through bores 33 and 35 as previously described. When the slide valve has reached its extreme right-hand position, however, the bore 35 is in connection with chamber 21 (which is now open to the atmosphere) and the diaphragm chamber 91 is, therefore, open to the atmosphere. It can be seen, therefore, that whenever the chambers 20 and 21 are open to the atmosphere the respective diaphragms 90 and 91 are likewise exhausted.

The type of valve slide arrangement is well-known to those skilled in the art. The pulsations are intermittent since the slide valve is continually reciprocating. As the valve slide thus reciprocates, the pin 88 also moves back and forth. The pin 88 is moved within the slot 87 of the arm 85 thus, in turn, reciprocating or oscillating the arm 85. As the arm 85 is thus moved, the shaft 79 is oscillated, thereby imparting reciprocating movement to the pawl 77. The pawl thereupon engages one ratchet tooth upon each complete reciprocation thereby angularly rotating the cap 64. The cap 64 is thus rotated until the opening 75 is in communication with the bore 76 whereupon a vacuum depression is formed in the space between the pivot plate 68 and the cap. In view of this depression, therefore, the signalling or sound emitting device starts an audible signal which is heard by the operator who will thereupon realize that the milking operation has been completed.

It can thus be seen that a positive mechanical linkage has been provided for actuating the timing device of a pulsator. The connection between the slide valve 29 and the cap 64 is a positive connection whereupon reciprocation of the valve is induced to positively move the cap 64. As the cap 64 is thus positively moved an accurate timing of the milking operation is possible. The positive connection between the reciprocating slide valve and the pawl and ratchet arrangement assures an effective operation of the mechanism.

Only a preferred embodiment of the invention has been illustrated and it is understood that applicant claims as his invention all modifications falling within the spirit of the invention as disclosed, and within the scope as defined in the appended claims.

What is claimed is:

1. A timer mechanism for milker pulsators having a body structure including a vacuum chamber, means connecting said chamber with a vacuum line, connecting means arranged to connect a milker unit to said body structure, means for intermittently supplying a pulsating pressure to said connecting means including a pressure operated valve arranged to reciprocate on said body structure; comprising in combination with said body structure, a rotatable member mounted on the body structure, said member having a plurality of ratchet teeth, a conduit on said body structure, said conduit having communication with a source of vacuum, said rotatable member having an air opening adapted to register with said conduit at one point during rotation of said member, means communicating with said opening and the atmosphere including a sound-emitting device, means for rotating said member including a pawl adapted to engage the ratchet teeth for rotating said member in an angular direction, a vertically extending shaft connected to said body structure, means rotatably and eccentrically connecting said shaft to said pawl, an arm rigidly secured to said shaft, said arm having a slotted portion, a pin projecting outwardly from the pressure operated valve, said pin being arranged to slidably engage the slotted portion of said arm, whereby said arm is rotated during reciprocation of said valve thereby imparting reciprocating movement to said pawl, and index means on said rotatable member whereby said member may be set at variable locations to determine the elapsed time until operation of said sound-emitting device.

2. A timer mechanism for milker pulsators having a body structure including a vacuum chamber, means connecting said chamber with a vacuum line, connecting means arranged to connect a milker unit to said body structure, means for intermittently supplying a pulsating pressure to said connecting means including a pressure operated valve arranged to reciprocate on said body structure; comprising in combination with said body structure, a rotatable member mounted on the body structure, said member having a plurality of ratchet teeth, a conduit on said body structure, said conduit having communication with a source of vacuum, said rotatable member having an air opening adapted to register with said conduit at one point during rotation of said member, means communicating with said opening and the atmosphere including a signalling device, means for rotating said member including a pawl adapted to engage the ratchet teeth for rotating said member in an angular direction, a vertically extending shaft connected to said body structure, means rotatably and eccentrically connecting said shaft to said pawl, an arm rigidly secured to said shaft, a pin projecting outwardly from the pressure operated valve, said pin being arranged to slidably engage said arm, whereby said arm is rotated during reciprocation of said valve thereby imparting reciprocating movement to said pawl, and index means on said rotatable member whereby said member may be set at variable locations to determine the elapsed time until operation of said signalling device.

3. A timer mechanism for milker pulsators having a body structure, including a vacuum chamber, conduit means connecting said vacuum chamber with a source of vacuum, connecting means arranged to connect a milker to said body structure, means for intermittently supplying a pulsating pressure to said connecting means including a pressure operated valve arranged to reciprocate on said body structure; comprising in combination with said body structure a rotatable member having a plurality of ratchet teeth, a signalling means, means responsive to the rotation of said rotatable member for actuating said signalling means, means for rotating said member including a pawl for engaging the ratchet teeth for rotating said member in an angular direction, a vertically extending shaft connected to said body structure, means rotatably connecting said shaft to said pawl, a horizontally extending arm rigidly connected to said shaft, said arm having a slotted portion, a pin connected to and projecting outwardly from said valve, said pin being reciprocable with said valve and engaging said slotted portion of said arm whereby said arm is moved and said pawl is reciprocated for moving said rotatable member.

4. A timer mechanism for milker pulsators having a body structure, including a vacuum chamber, conduit means connecting said vacuum chamber with a source of vacuum, connecting means arranged to connect a milker to said body structure, means for intermittently supplying a pulsating pressure to said connecting means including a pressure operated valve arranged to reciprocate on said body structure; comprising in combination with said body structure a rotatable member having a plurality of ratchet teeth, a signalling means, means responsive to the rotation of said rotatable member for actuating said signalling means, means for rotating said member including a pawl for engaging the ratchet teeth for rotating said member in an angular direction, a shaft connected to said body structure, means rotatably and eccentrically connecting said shaft to said pawl, a horizontally extending arm rigidly connected to said shaft, a pin connected to and projecting outwardly from said valve, said pin being reciprocable with said valve and engaging said arm whereby said arm is moved and said pawl is reciprocated for moving said rotatable member.

5. A timer mechanism for milker pulsators having a body structure including a vacuum chamber, conduit means connecting said vacuum chamber with a source of vacuum, connecting means arranged to connect a milker to said body structure, a pressure operated valve arranged to reciprocate on said body structure for supplying intermittent vacuum pulsations to said connecting means; comprising in combination with said body structure, a rotatable member having a plurality of ratchet teeth, a signalling means, means responsive to the rotation of said member for actuating said signalling means, means for rotating said member including a pawl engaging said ratchet teeth, and mechanical linkage means directly connecting said pawl and said valve whereby said pawl is directly and positively moved by said valve during its reciprocation thereby moving said rotatable member.

WILLIAM H. HARSTICK.

REFERENCES CITED

The following references are of record in the file of this patent:

UNITED STATES PATENTS

| Number | Name | Date |
| --- | --- | --- |
| 2,230,148 | Standow | Jan. 28, 1941 |
| 2,480,239 | Harstick | Aug. 30, 1949 |